US010802563B2

(12) United States Patent
Gu (10) Patent No.: US 10,802,563 B2
(45) Date of Patent: Oct. 13, 2020

(54) POWER SUPPLY APPARATUS AND METHOD FOR SERVER (71) Applicant: ZHENGZHOU YUNHAI INFORMATION TECHNOLOGY CO., LTD., Zhengzhou, Henan (CN)

(72) Inventor: Junjie Gu, Henan (CN)

(73) Assignee: ZHENGZHOU YUNHAI INFORMATION TECHNOLOGY CO., LTD., Zhengzhou, Henan (CN)

( * ) Notice: Subject to any disclaimer, the term of this patent is extended or adjusted under 35 U.S.C. 154(b) by 139 days.

(21) Appl. No.: 16/096,989

(22) PCT Filed: Jul. 20, 2017

(86) PCT No.: PCT/CN2017/093684
§ 371 (c)(1),
(2) Date: Oct. 26, 2018

(87) PCT Pub. No.: WO2018/076825
PCT Pub. Date: May 3, 2018

(65) Prior Publication Data
US 2019/0113958 A1 Apr. 18, 2019

(30) Foreign Application Priority Data

Oct. 25, 2016 (CN) .......................... 2016 1 0938589

(51) Int. Cl.
*G06F 11/30* (2006.01)
*G06F 1/30* (2006.01)
(Continued)

(52) U.S. Cl.
CPC .................. *G06F 1/30* (2013.01); *G06F 1/28* (2013.01); *G06F 1/305* (2013.01); *G06F 1/3203* (2013.01)

(58) Field of Classification Search
CPC ............... G06F 1/30; G06F 1/28; G06F 1/305
(Continued)

(56) References Cited

U.S. PATENT DOCUMENTS 4,999,585 A * 3/1991 Burt .......................... H03F 1/32
330/149
5,949,662 A * 9/1999 Boldin .................... H02J 9/062
363/37
(Continued)

FOREIGN PATENT DOCUMENTS

CN 202737569 U 2/2013
CN 104578385 A 4/2015
(Continued)

OTHER PUBLICATIONS

International Search Report for PCT/CN2017/093684 dated Sep. 29, 2017, ISA/CN.

*Primary Examiner* — Volvick Derose
(74) *Attorney, Agent, or Firm* — Yue (Robert) Xu; Apex Attorneys at Law, LLP (57) ABSTRACT A server power supply device and method are provided. The server power supply device includes: a filter capacitor, a voltage collecting unit and a processing unit. One terminal of the filter capacitor is connected to a mains electricity input terminal, the other terminal of the filter capacitor is grounded, and a capacitance of the filter capacitor is greater than a preset standard capacitance. The voltage collecting unit is connected to the mains electricity input terminal and the processing unit, and the voltage collecting unit is configured to collect a first voltage inputted from the mains electricity input terminal. The processing unit is configured to process a current inputted from the mains electricity input terminal based on the first voltage collected by the voltage (Continued)

collecting unit, to generate a first current and supply power to a server with the first current.

12 Claims, 5 Drawing Sheets

(51) Int. Cl.
*G06F 1/28* (2006.01)
*G06F 1/3203* (2019.01)

(58) Field of Classification Search
USPC .......................................................... 713/340
See application file for complete search history.

(56) References Cited

U.S. PATENT DOCUMENTS

| | | | |
|---|---|---|---|
| 2003/0042877 A1* | 3/2003 | Tasi | H02J 3/1814 323/207 |
| 2005/0226014 A1* | 10/2005 | Chang | H02M 7/1623 363/84 |
| 2007/0001624 A1 | 1/2007 | Blondia | |
| 2007/0274115 A1* | 11/2007 | Michaels | H02J 9/062 363/164 |
| 2008/0013351 A1* | 1/2008 | Alexander | H02M 3/1582 363/123 |
| 2008/0061628 A1* | 3/2008 | Nielsen | H02J 9/062 307/66 |
| 2010/0109618 A1* | 5/2010 | Prasad | H02M 7/17 323/234 |
| 2013/0026834 A1* | 1/2013 | Matsuoka | H02J 9/062 307/64 |
| 2014/0204614 A1* | 7/2014 | Elam | H02M 1/126 363/16 |
| 2015/0180325 A1* | 6/2015 | Liang | H02M 1/15 363/21.09 |
| 2015/0318737 A1* | 11/2015 | Colombi | H02M 7/48 307/66 |
| 2017/0006675 A1* | 1/2017 | van den Broeke | H05B 45/14 |
| 2017/0033678 A1* | 2/2017 | Park | H02M 5/458 |

FOREIGN PATENT DOCUMENTS

| | | |
|---|---|---|
| CN | 106018937 A | 10/2016 |
| CN | 106527648 A | 3/2017 |

\* cited by examiner

POWER SUPPLY APPARATUS AND METHOD FOR SERVER

This application is the national phase of International Patent Application No. PCT/CN2017/093684, titled "POWER SUPPLY APPARATUS AND METHOD FOR SERVER", filed on Jul. 20, 2017, which claims the priority to Chinese Patent Application No. 201610938589.9, titled "POWER SUPPLY APPARATUS AND METHOD FOR SERVER", filed on Oct. 25, 2016 with the Chinese Patent Office, both of which are incorporated herein by reference in their entireties.

FIELD

The present disclosure relates to the technical field of electronic engineering, and in particular to a server power supply device and method.

BACKGROUND

A server, which is a computer with a high reliability and a high performance, is widely used in various fields. In order to ensure that the server is operated reliably, an increasing requirement is imposed on the stability of power supply to the server.

At present, in order to deploy the servers in an efficient way and with a low cost, a mains electricity direct input manner is adopted for some servers, that is, power is supplied to the servers directly from the mains electricity grid without being processed by a series of processes such as rectification and inverting.

A power consumption device such as an electric motor, a relay device and an uninterrupted power supply UPS generates a high order harmonic in a power grid, which may distorts waveforms of a voltage and a current in the power grid. Since power supplied to the server is not processed by a series of processes such as rectification and inverting, a harmonic current may be increased due to the distortion of the waveforms of the voltage and the current in the power grid, thereby resulting in an unstable power factor PF. An instantaneous large current may be caused in a case that the PF is decreased, such that a power distribution cabinet, transmission cable and the like of the server operate in an overloaded state due to the instantaneous large current, thereby resulting in a low stability of the power supply to the server.

SUMMARY

A server power supply device and method are provided according to the embodiments of the present disclosure, which can improve a stability of power supply to a server.

A server power supply device is provided according to an embodiment of the present disclosure, which includes: a filter capacitor, a voltage collecting unit and a processing unit. One terminal of the filter capacitor is connected to a mains electricity input terminal, and the other terminal of the filter capacitor is grounded. A capacitance of the filter capacitor is greater than a preset standard capacitance. The voltage collecting unit is connected to the mains electricity input terminal and a control unit. The voltage collecting unit is configured to collect a first voltage inputted from the mains electricity input terminal. The processing unit is configured to process the current inputted from the mains electricity input terminal based on the first voltage collected by the voltage collecting unit to generate a first current, and supply power to a server with the first current.

Preferably, the processing unit includes a phase adjusting sub-unit. The phase adjusting sub-unit is configured to adjust a waveform of the current inputted from the mains electricity input terminal based on a waveform of the first voltage to generate the first current. A difference between a phase of the waveform of the first current and a phase of the waveform of the first voltage waveform is less than a preset standard angle.

Preferably, the device further includes a current collecting unit. The current collecting unit is configured to collect a second current at a current input terminal of the server. The processing unit is further configured to filter the first current based on the second current collected by the current collecting unit to generate a third current; and transmit the third current to the current input terminal of the server to supply power to the server.

Preferably, the device further includes an uninterrupted power supply. The uninterrupted power supply is configured to convert a stored direct current power into an alternating current power through an inverter circuit and supply power to the server with the generated alternating current power, in a case that there is no voltage inputted from the mains electricity input terminal.

Preferably, the processing unit includes a power supply management chip.

A server power supply method is further provided according to an embodiment of the present disclosure. The method includes: connecting one terminal of the filter capacitor to a mains electricity input terminal, and connecting the other terminal of the filter capacitor to the ground, where a capacitance of the filter capacitor is greater than a preset standard capacitance. The method further includes:

collecting a first voltage inputted from the mains electricity input terminal;

processing a current inputted from the mains electricity input terminal based on the first voltage to generate a first current; and supplying power to the server with the first current.

Preferably, the processing the current inputted from the mains electricity input terminal based on the first voltage to generate the first current includes:

adjusting a waveform of the current inputted from the mains electricity input terminal based on a waveform of the first voltage to generate the first current. A difference between a phase of the waveform of the first current and a phase of the waveform of the first voltage is less than a preset standard angle.

Preferably, the supplying power to the server with the first current includes:

collecting a second current at a current input terminal of the server;

filtering the first current based on the second current, to generate a third current; and transmitting the third current to the current input terminal of the server to supply power to the server.

Preferably, the method further includes:

determining whether there is a voltage inputted from the mains electricity input terminal; and converting a stored direct current power into an alternating current power through an inverter circuit and supplying power to the server with the generated alternating current power, in a case that there is no voltage inputted from the mains electricity input terminal.

Preferably, before connecting the one terminal of the filter capacitor to the mains electricity input terminal, and connecting the other terminal of the filter capacitor to the ground, the method further includes:

calculating a standard capacitance based on a frequency and an input voltage of a mains electricity and a predicted power factor PF according to following formula 1; and determining the filter capacitor based on the standard capacitance, wherein a capacitance of the filter capacitor is greater than the standard capacitance.

The formula 1 is expressed by:

$$C = \frac{1}{V \cdot \sin\left[\frac{\pi}{2} \cdot \varphi - (\arccos p)\right]}$$

where C represents the standard capacitance, V represents the input voltage of the mains electricity, φ represents the frequency of the mains electricity, and p represents the predicted power factor PF.

A server power supply device and method are provided according to the embodiments of the present disclosure. One terminal of the filter capacitor is connected to the mains electricity input terminal, and the other terminal of the filter capacitor is grounded. The voltage collecting unit is connected to the mains electricity power input terminal, to collect the first voltage. The processing unit is configured to process the current inputted from the mains electricity input terminal based on the first voltage, to generate the first current, and supply power to the server with the first current. Since the capacitance of the filter capacitor is greater than the preset standard capacitance, the voltage collected by the voltage collecting unit lags behind a voltage actually inputted from the mains electricity input terminal under an action of the filter capacitor, such that the current inputted from the mains electricity input terminal lags behind the first voltage collected by the voltage collecting unit, and an input impedance of the mains electricity is inductive. In this way, a high frequency disturbance of an input voltage can be suppressed, such that the harmonic current in the power supply line can be maintained at a low level, thereby reducing an occurrence of the instantaneous large current, thus improving the stability of power supply to the server.

BRIEF DESCRIPTION OF THE DRAWINGS

The drawings to be used in the description of the embodiments or the conventional technology are described briefly hereinafter, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION

For making the objects, technical solutions and advantages of the embodiments of the present disclosure more clear, the technical solutions in the embodiments of the present disclosure are described clearly and completely hereinafter in conjunction with the drawings in the embodiments of the present disclosure. The described embodiments are some of the embodiments of the present disclosure, rather than all of the embodiments. Based on the embodiments in the present disclosure, all of other embodiments, made by those skilled in the art without any creative efforts, should fall into the protection scope of the present disclosure.

Figure 1:
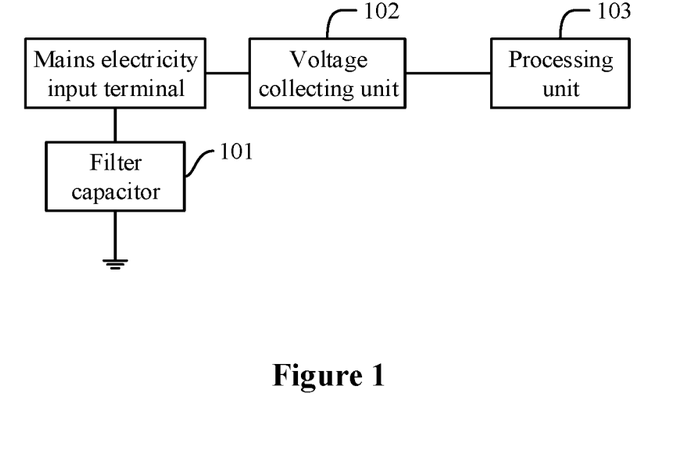
FIG. 1 is a schematic diagram of a server power supply device according to an embodiment of the present disclosure.

As shown in FIG. 1, a server power supply device is provided according to an embodiment of the present disclosure, which includes: a filter capacitor 101, a voltage collecting unit 102 and a processing unit 103. One terminal of the filter capacitor 101 is connected to a mains electricity input terminal, and the other terminal of the filter capacitor is grounded. A capacitance of the filter capacitor 101 is greater than a preset standard capacitance.

The voltage collecting unit 102 is connected to the mains electricity input terminal and a control unit. The voltage collecting unit 102 is configured to collect a first voltage inputted from the mains electricity input terminal. The processing unit 103 is configured to process a current inputted from the mains electricity input terminal based on the first voltage collected by the voltage collecting unit 102 to generate a first current, and supply power to the server with the first current.

A server power supply device is provided according to an embodiment of the present disclosure, one terminal of the filter capacitor is connected to a mains electricity input terminal, and the other terminal of the filter capacitor is grounded. The voltage collecting unit is connected to the mains electricity input terminal to collect a first voltage. The processing unit is configured to process a current inputted from the mains electricity input terminal based on the first voltage, to generate a first current, and supply power to the server with the first current. Since the capacitance of the filter capacitor is greater than the preset standard capacitance, the voltage collected by the voltage collecting unit lags behind a voltage actually inputted from the mains electricity input terminal due to an action of the filter capacitor, such that the current inputted from the mains electricity input terminal lags behind the first voltage collected by the voltage collecting unit, and an input impedance of the mains electricity is inductive. In this way, a high frequency disturbance of an input voltage can be suppressed, such that a harmonic current in a power supply line is maintained at a low level, thereby reducing an occurrence of the instantaneous large current, thus improving the stability of the power supply to the server.

In an embodiment of the present disclosure, the processing unit 103 includes a phase adjusting sub-unit. The phase adjusting sub-unit is configured to adjust a waveform of the current inputted from the mains electricity input terminal based on a waveform of the first voltage to generate the first current. A difference between a phase of the waveform of the first current and a phase of the waveform of the first voltage waveform is less than a preset standard angle.

Specifically, the waveform of the current inputted from the mains electricity input terminal is adjusted based on the waveform of the first voltage, to generate the first current. The difference between a phase of the waveform of the first current and a phase of the waveform of the first voltage is less than the preset standard angle, for example, 0.1 degree. Then, the server is supplied with power with the first current.

Since the difference between a phase of the first voltage and a phase of the first current is less than the standard angle, it can be ensured that there is a good synchronization between the first voltage and the first current, such that the power factor PF can be increased. The power factor PF is increased, such that reactive power generated by the server may be reduced, and a proportion of active power in the power supplied to the server is increased, thereby improving the utilization efficiency of the power supplied to the server, thus reducing a cost of the power supply to the server.

Figure 2:
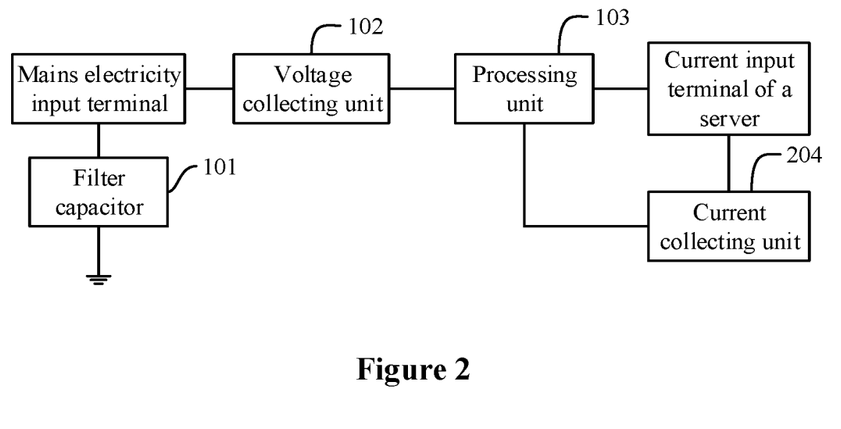
FIG. 2 is a schematic diagram of a server power supply device according to another embodiment of the present disclosure.

In an embodiment of the present disclosure, as shown in FIG. 2, the device further includes a current collecting unit 204. The current collecting unit 204 is configured to collect a second current at the current input terminal of the server. The processing unit 103 is further configured to filter the first current based on the second current collected by the current collecting unit 204 to generate a third current; and transmit the generated third current to the current input terminal of the server to supply power to the server with the third current.

Specifically, the second current at the current input terminal of the server is collected by the current collecting unit, and the first current is filtered based on the second current, to generate the third current, thereby ensuring that the third current is more stable. Taking the current at the current input terminal of the server as a feedback signal, the first current is filtered based on the feedback signal, such that the current inputted to the server is more stable, thereby further improving the stability of the power supply to the server.

Figure 3:
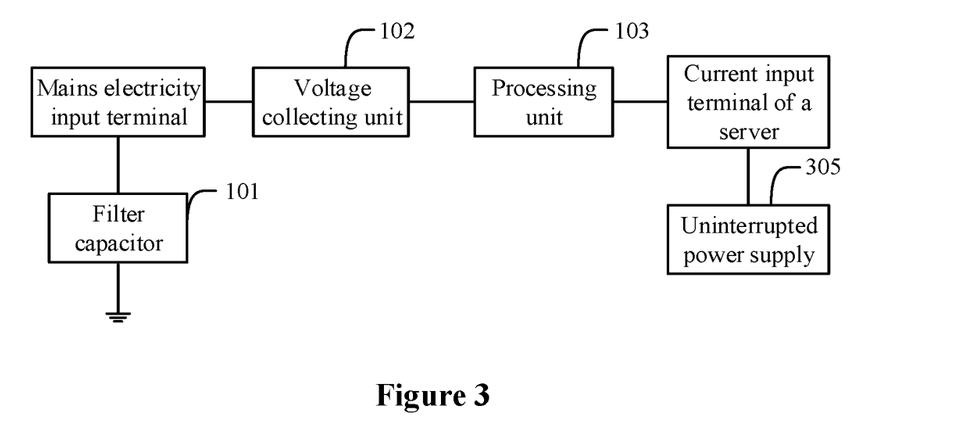
FIG. 3 is a schematic diagram of a server power supply device according to another embodiment of the present disclosure.

In an embodiment of the present disclosure, as shown in FIG. 3, the device may further include an uninterrupted power supply 305. The uninterrupted power supply 305 is configured to convert a stored direct current power into an alternating current power through an inverter circuit and supply power to the server with the generated alternating current power, in a case that there is no voltage inputted from the mains electricity input terminal.

Specifically, since the uninterrupted power supply is provided with a direct current battery pack, in a case that there is a voltage inputted from the mains electricity input terminal, the direct current battery pack is charged; and in a case that there is no voltage inputted from the mains electricity input terminal, the uninterrupted power supply may covert the direct current power stored in the direct current battery pack to an alternating current power, and supplies power to the server with the generated alternating current power, thereby ensuring the continuity of an operation of the server, thus improving the reliability of the power supply to the server.

In an embodiment of the present disclosure, the processing unit may be implemented by a power supply management chip, for example, a PI chip. Since the power supply management chip has a small size and the technology of manufacturing the power management chip is mature, the function of the processing unit is realized by the power management chip, such that the stability of the operation of the server power supply device can be ensured and a low cost of the server power supply device can be achieved.

Figure 4:
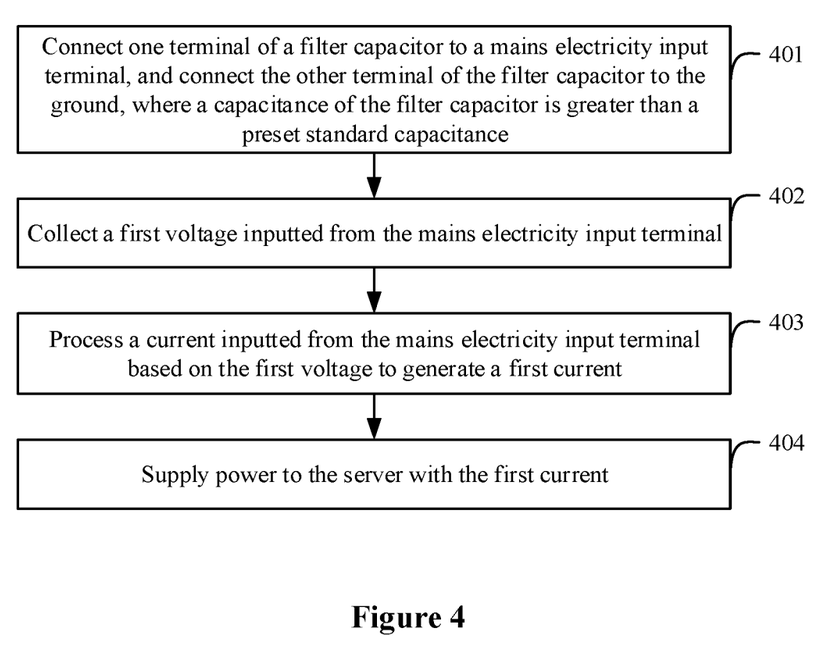
FIG. 4 is a flowchart of a server power supply method according to an embodiment of the present disclosure.

As shown in FIG. 4, a server power supply method is provided according to an embodiment of the present disclosure, which includes the following step 401 to step 404.

In step 401, one terminal of the filter capacitor is connected to a mains electricity input terminal, the other terminal of the filter capacitor is grounded, and a capacitance of the filter capacitor is greater than a preset standard capacitance.

In step 402, a first voltage inputted from the mains electricity input terminal is collected.

In step 403, a current inputted from the mains electricity input terminal is processed based on the first voltage to generate a first current.

In step 404, the server is supplied with power with the first current.

A server power supply method is provided according to an embodiment of the present disclosure, one terminal of the filter capacitor is connected to the mains electricity input terminal, and the other terminal of the filter capacitor is grounded. Since the capacitance of the filter capacitor is greater than the preset standard capacitance, the collected first voltage lags behind the voltage actually inputted from the mains electricity input terminal due to an action of the filter capacitor, such that the current inputted from the mains electricity input terminal lags behind the first voltage, and an input impedance of the mains electricity is inductive. In this way, a high frequency disturbance of an input voltage can be suppressed, such that a harmonic current in a power supply line is maintained at a low level, thereby reducing an occurrence of the instantaneous large current, thus improving the stability of the power supply to the server.

In an embodiment of the present disclosure, the process of processing the current inputted from the mains electricity input terminal based on the first voltage in step 403 may include: adjusting a waveform of the current inputted from the mains electricity input terminal based on a waveform of the first voltage to generate the first current, a difference between a phase of the waveform of the first current and a phase of the waveform of the first voltage is less than a preset standard angle.

Specifically, the current inputted from the mains electricity input terminal is adjusted, to make the phase of the generated first current close to the phase of the first voltage, such that there is a good synchronization between the first voltage and the first current, thereby increasing the power factor PF. The power factor PF is increased, such that the reactive power generated by the server is reduced, and a proportion of the active power in the power supplied to the server is increased, thereby improving the utilization efficiency of the power supplied to the server, thus reducing a cost of the power supply to the server.

In an embodiment of the present disclosure, after the first current is collected, a second current at the current input terminal of the server may also be collected. The first current is filtered based on the second current to generate a third current, and the third current is transmitted to the current input terminal of the server to supply power to the server.

Specifically, the first current is filtered based on the second current at the current input terminal of the server, such that the current inputted to the server is more stable, thereby further improving the stability of the power supply to the server.

In an embodiment of the present disclosure, during the operation of the server, it may be determined whether there is a voltage inputted from the mains electricity input terminal. In a case that there is no voltage inputted from the mains electricity input terminal, a stored direct current power is converted into an alternating current power through an inverter circuit, and the server is supplied with power with the generated alternating current power. In this power supply mode, in a case that the mains electricity power supply system fails to supply power to the server normally, the server may be supplied with power by the uninterrupted power supply, such that the server can be operated continually, thereby improving the reliability of the power supply to the server.

In an embodiment of the present disclosure, before the filter capacitor is connected to the mains electricity input terminal, it is required to select a capacitor with a suitable capacitance. First, a standard capacitance is calculated based on a frequency and an input voltage of the mains electricity and a predicted power factor PF according to the following formula 1. Then, the filter capacitor is determined based on the calculated standard capacitance. The capacitance of the determined filter capacitor is greater than the calculated standard capacitance.

The formula 1 is expressed by:

$$C = \frac{1}{V \cdot \sin\left[\frac{\pi}{2} \cdot \varphi - (\arccos p)\right]}$$

where C represents the standard capacitance, V represents the input voltage of the mains electricity, φ represents the frequency of the mains electricity, and p represents the predicted power factor PF.

Specifically, since the power factor PF is inversely proportional to the capacitance of the capacitor and the input voltage of the mains electricity, a standard capacitance capable of causing the collected input voltage to lag behind the actually inputted voltage may be calculated according to the above formula 1. A capacitor with a capacitance greater than the standard capacitance is determined as the filter capacitor, such that the collected first voltage lags behind the voltage actually inputted at the mains electricity input terminal, thereby ensuring the feasibility of the server power supply method.

Figure 5:
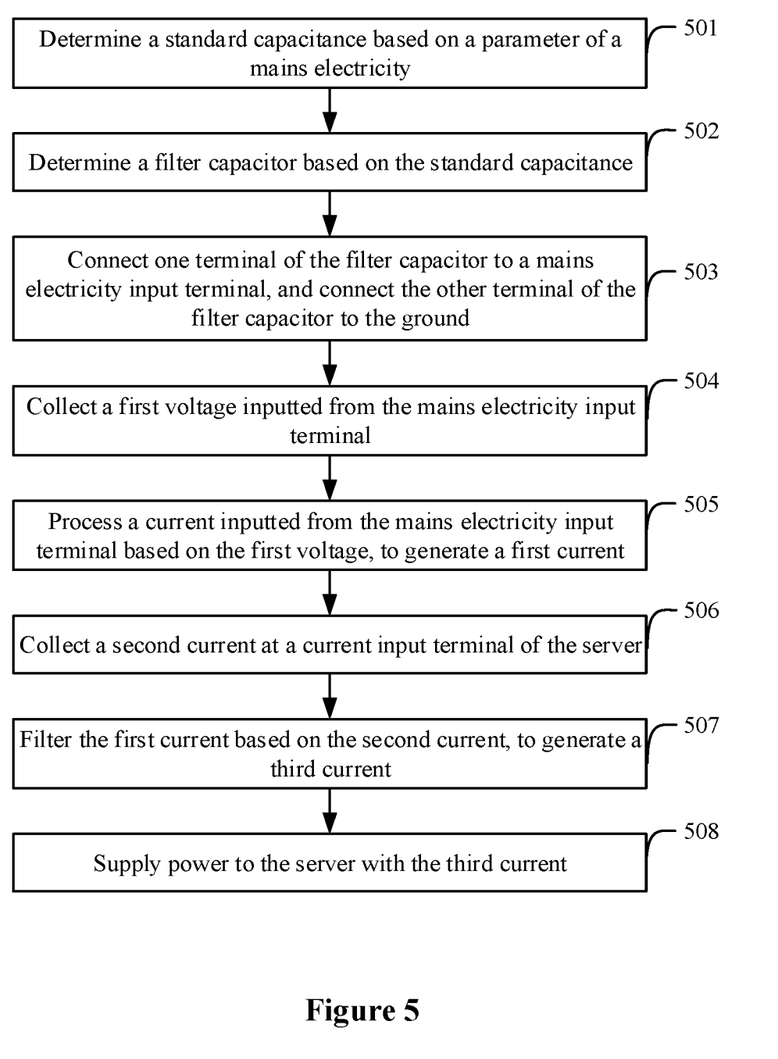
FIG. 5 is a flowchart of a server power supply method according to another embodiment of the present disclosure.

The server power supply method according to an embodiment of the present disclosure is further described in detail hereinafter in combination with the server power supply device shown in FIG. 2 and FIG. 4. As shown in FIG. 5, the method may include the following step 501 to step 508.

In step 501, the standard capacitance is determined based on a parameter of a mains electricity.

In an embodiment of the present disclosure, the standard capacitance is calculated based on the input voltage and the frequency of the mains electricity and a target power factor PF of the server according to the following formula 1.

The formula 1 is expressed by:

$$C = \frac{1}{V \cdot \sin\left[\frac{\pi}{2} \cdot \varphi - (\arccos p)\right]}$$

where C represents the standard capacitance, V represents the input voltage of the mains electricity, φ represents the frequency of the mains electricity, and p represents the target power factor PF of the server.

For example, in a case that the input voltage of the mains electricity is 308V, the frequency of the mains electricity is 50 Hz, and the target power factor PF of the server is 0.9, the standard capacitance calculated according to the above formula 1 is 25 nF.

In step 502, the filter capacitor is determined based on the standard capacitance.

In an embodiment of the present disclosure, a capacitor with a capacitance greater than the standard capacitance is determined as the filter capacitor based on the standard capacitance calculated in step 501.

For example, a capacitor with a capacitance of 27 nF is determined as the filter capacitor.

In step 503, one terminal of the filter capacitor is connected to the mains electricity input terminal, and the other terminal of the filter capacitor is grounded.

In an embodiment of the present disclosure, after the filter capacitor is determined, as shown in FIG. 2, the one terminal of the filter capacitor is connected to the mains electricity input terminal, and the other terminal of the filter capacitor is grounded.

In step 504, a first voltage inputted from the mains electricity input terminal is collected.

In an embodiment of the present disclosure, as shown in FIG. 2, the first voltage inputted from the mains electricity input terminal is collected by the voltage collecting unit. The collected first voltage lags behind the voltage actually inputted from the mains electricity input terminal due to an action of the filter capacitor.

In step 505, the current inputted from the mains electricity input terminal is processed based on the first voltage to generate the first current.

In an embodiment of the present disclosure, after the first voltage is collected, a waveform of the current inputted from the mains electricity input terminal is adjusted based on a waveform of the first voltage to generate the first current, a difference between a phase of the waveform of the first current and a phase of the waveform of the first voltage is less than a preset standard angle.

For example, the waveform of the current inputted from the mains electricity input terminal is adjusted in real time based on the real-time waveform of the first voltage. For example, the current inputted from the mains electricity input terminal is delayed by 2.5 degree at a certain time to generate the first current, in this way, the phase of the waveform of the first current is the same as the phase of the waveform of the first voltage.

In step 506, a second current at the current input terminal of the server is collected.

In an embodiment of the present disclosure, the second current inputted to the server is detected at the current input terminal of the server.

In step 507, the first current is filtered based on the second current, to generate a third current.

In an embodiment of the present disclosure, the first current is filtered based on the second current, to generate a more stable third current.

In step 508, the server is supplied with power with the third current.

In an embodiment of the present disclosure, the third current is transmitted to the current input terminal of the server, and the server is supplied with power with the third current.

With the server power supply device and method according to the embodiments of the present disclosure, at least the following beneficial effects can be achieved.

1. In the server power supply device and method according to the embodiments of the present disclosure, one terminal of the filter capacitor is connected to the mains electricity input terminal, and the other terminal of the filter capacitor is grounded. The voltage collecting unit is connected to the mains electricity input terminal to collect the first voltage. The processing unit is configured to process the current inputted from the mains electricity input terminal based on the first voltage to generate the first current and supplies power to the server with the first current. Since the capacitance of the filter capacitor is greater than the preset standard capacitance, the voltage collected by the voltage collecting unit lags behind the voltage actually inputted from the mains electricity input terminal due to an action of the filter capacitor, such that the current inputted from the mains electricity input terminal lags behind the first voltage collected by the voltage collecting unit, and an input impedance of the mains electricity is inductive. In this way, a high frequency disturbance of the input voltage can be suppressed, such that the harmonic current in the power supply line can be maintained at a low level, thereby reducing an occurrence of the instantaneous large current, thus improving the stability of the power supply to the server.

2. In the server power supply device and method according to the embodiments of the present disclosure, the waveform of the current inputted from the mains electricity input terminal is adjusted based on the waveform of the first voltage, to generate the first current, the difference between a phase of the waveform of the first current and a phase of the waveform of the first voltage is less than the preset standard angle, and the server is supplied with power with the first current. Since the difference between a phase of the first voltage and a phase of the first current is less than the standard angle, it can be ensured that there is a good synchronization between the first voltage and the first current, such that the power factor PF can be increased. The power factor PF is increased, such that the reactive power generated by the server can be reduced, and a proportion of the active power in the power supplied to the server is increased, thereby improving the utilization efficiency of the power supplied to the server, thus reducing a cost of the power supply to the server.

3. In the server power supply device and method according to the embodiments of the present disclosure, the second current at the current input terminal of the server is collected by the current collecting unit, and the first current is filtered based on the second current, to generate the third current, thereby ensuring that the third current is more stable. Taking the current at the current input terminal of the server as a feedback signal, the first current is filtered based on the feedback signal, such that the current inputted to the server is more stable, thereby further improving the stability of the power supply to the server.

4. In the server power supply device and method according to the embodiments of the present disclosure, the uninterrupted power supply is provided with the direct current battery pack, in a case that there is a voltage inputted from the mains electricity input terminal, the direct current battery pack is charged; and in a case that there is no voltage inputted from the mains electricity input terminal, the uninterrupted power supply may covert the direct current power stored in the direct current battery pack to an alternating current power, and supplies power to the server with the generated alternating current power, thereby ensuring the continuity of the operation of the server, thus improving the reliability of the power supply to the server.

It is to be noted that the relationship terminologies such as "first", "second" and the like are only used herein to distinguish one entity or operation from another, rather than to necessitate or imply that the actual relationship or order exists between the entities or operations. Moreover, the terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical factors in the process, method, article, or device that includes said elements.

It is to understood by those skilled in the art that all or a part of the steps for implementing the embodiments of the method described above may be achieved by means of hardware instructed by program instructions. The aforementioned program may be stored in a computer-readable storage medium, and when the program is executed, the steps including the embodiments of the method described above are executed. The above storage medium includes various medium that may store program codes, such as a ROM, a RANI, a magnetic disk or an optical disk.

It is to be noted that the above description only shows preferred embodiments of the present disclosure, which are only used for explaining the technical solutions of the present disclosure and are not intended to limit the protection scope of the present disclosure. Any modifications, equivalent substitutions, improvements, and the like made within the spirit and the principle of the present disclosure are intended to be included within the protection scope of the present disclosure.

The invention claimed is:

1. A server power supply device, comprising: a filter capacitor, a voltage collecting unit and a processing unit; wherein
one terminal of the filter capacitor is connected to a mains electricity input terminal, the other terminal of the filter capacitor is grounded, and a capacitance of the filter capacitor is greater than a preset standard capacitance;
the voltage collecting unit is connected to the mains electricity input terminal and the processing unit;
the voltage collecting unit is configured to collect a first voltage inputted from the mains electricity input terminal; and
the processing unit is configured to process a current inputted from the mains electricity input terminal based on the first voltage collected by the voltage collecting unit, to generate a first current and supply power to a server with the first current;
wherein the preset standard capacitance is calculated according to following formula 1:

$$C = \frac{1}{V \cdot \sin\left[\frac{\pi}{2} \cdot \varphi - (\arccos p)\right]}$$

wherein C represents the standard capacitance, V represents an input voltage of the mains electricity, φ represents a frequency of the mains electricity, and p represents a predicted power factor PF.

2. The device according to claim 1, wherein
the processing unit comprises a phase adjusting sub-unit,
the phase adjusting sub-unit is configured to adjust a waveform of the current inputted from the mains electricity input terminal based on a waveform of the first voltage to generate the first current, wherein a difference between a phase of the waveform of the first current and a phase of the waveform of the first voltage is less than a preset standard angle.

3. The device according to claim 2, wherein
the processing unit comprises a power supply management chip.

4. The device according to claim 1, further comprising: a current collecting unit, wherein
the current collecting unit is configured to collect a second current at a current input terminal of the server,
the processing unit is further configured to filter the first current based on the second current collected by the current collecting unit to generate a third current; and transmit the third current to the current input terminal of the server to supply power to the server.

5. The device according to claim 4, wherein
the processing unit comprises a power supply management chip.

6. The device according to claim 1, further comprising: an uninterrupted power supply, wherein
the uninterrupted power supply is configured to convert a stored direct current power into an alternating current power through an inverter circuit and supply power to the server with the generated alternating current power, in a case that there is no voltage inputted from the mains electricity input terminal.

7. The device according to claim 6, wherein
the processing unit comprises a power supply management chip.

8. The device according to claim 1, wherein
the processing unit comprises a power supply management chip.

9. A server power supply method, comprising:
connecting one terminal of a filter capacitor to a mains electricity input terminal, and connecting the other terminal of the filter capacitor to a ground, wherein a capacitance of the filter capacitor is greater than a preset standard capacitance;
collecting a first voltage inputted from the mains electricity input terminal;
processing a current inputted from the mains electricity input terminal based on the first voltage to generate a first current; and
supplying power to a server with the first current;
wherein before connecting the one terminal of the filter capacitor to the mains electricity input terminal, and connecting the other terminal of the filter capacitor to the ground, the method further comprises:

calculating a standard capacitance based on a frequency and an input voltage of a mains electricity, and a predicted power factor PF according to following formula 1; and
determining the filter capacitor based on the standard capacitance, wherein a capacitance of the filter capacitor is greater than the standard capacitance, and wherein
the formula 1 is expressed by:

$$C = \frac{1}{V \cdot \sin[\frac{\pi}{2} \cdot \varphi - (\arccos p)]}$$

wherein C represents the standard capacitance, V represents the input voltage of the mains electricity, $\varphi$ represents the frequency of the mains electricity, and p represents the predicted power factor PF.

10. The method according to claim 9, wherein
the processing the current inputted from the mains electricity input terminal based on the first voltage to generate the first current comprises:
adjusting a waveform of the current inputted from the mains electricity input terminal based on a waveform of the first voltage to generate the first current, wherein a difference between a phase of the waveform of the first current and a phase of the waveform of the first voltage is less than a preset standard angle.

11. The method according to claim 9, wherein
the supplying power to the server with the first current comprises:
collecting a second current at a current input terminal of the server;
filtering the first current based on the second current, to generate a third current; and
transmitting the third current to the current input terminal of the server to supply power to the server.

12. The method according to claim 9, further comprising:
determining whether there is a voltage inputted from the mains electricity input terminal; and
converting a stored direct current power into an alternating current power through an inverter circuit and supplying power to the server with the generated alternating current power, in a case that there is no voltage inputted from the mains electricity input terminal.

* * * * *